United States Patent
Krämer

(10) Patent No.: US 12,046,776 B2
(45) Date of Patent: Jul. 23, 2024

(54) ARRANGEMENT FOR CELLS FOR STORING ELECTRICAL ENERGY HAVING A SPRING CONTACT ELEMENT

(71) Applicant: Thomas Krämer, St. Julian's (MT)

(72) Inventor: Thomas Krämer, St. Julian's (MT)

(73) Assignee: E-Quikk Ltd., St. Julian's (MT)

( * ) Notice: Subject to any disclaimer, the term of this patent is extended or adjusted under 35 U.S.C. 154(b) by 0 days.

(21) Appl. No.: 17/102,733

(22) Filed: Nov. 24, 2020

(65) Prior Publication Data

US 2021/0083248 A1    Mar. 18, 2021

Related U.S. Application Data

(63) Continuation of application No. PCT/EP2019/063457, filed on May 24, 2019.

(30) Foreign Application Priority Data

May 25, 2018    (EP) .................................... 18174442

(51) Int. Cl.
*H01M 50/502*    (2021.01)
*H01M 50/213*    (2021.01)
(Continued)

(52) U.S. Cl.
CPC ....... *H01M 50/522* (2021.01); *H01M 50/213* (2021.01); *H01M 50/291* (2021.01); *H01M 50/503* (2021.01); *H01M 50/526* (2021.01)

(58) Field of Classification Search
CPC ............... H01M 50/20; H01M 50/502; H01M 2220/20; H01M 50/213; Y02E 60/10
See application file for complete search history.

(56) References Cited

U.S. PATENT DOCUMENTS 9,269,943 B1 *    2/2016    Nelson ................ H01M 50/597
2003/0077937 A1 *    4/2003    Berg .................... H01M 50/597
439/500
(Continued)

FOREIGN PATENT DOCUMENTS

CN    103137922 A    6/2013
CN    206312965 U    7/2017
(Continued)

OTHER PUBLICATIONS

Machine English translation of CN 206480686 (Year: 2017).*
(Continued)

*Primary Examiner* — Michael L Dignan
(74) *Attorney, Agent, or Firm* — Reinhart Boerner Van Deuren P.C.

(57) ABSTRACT

Embodiments of an arrangement for cells for storing electrical energy having at least two cells are disclosed. The cells each have an axial direction, a circumferential region, and two end faces. The end faces are arranged opposite one another in the axial direction and a pole region is provided at one end face with at least one connecting plate. The cells are arranged at the connecting plate. Contact elements are provided between the connecting plate and the pole regions of the cells for an electrical contact. The problem of providing an arrangement which enables simple and reliable contacting of cells is solved in that the contact elements in contact with a cell is designed as a spring contact element which, in a deformed state, provides a spring force for bearing against the pole region of the cells to form the electrical contact between the connecting plate and pole region.

1 Claim, 5 Drawing Sheets

(51) Int. Cl.
  *H01M 50/291* (2021.01)
  *H01M 50/503* (2021.01)
  *H01M 50/522* (2021.01)
  *H01M 50/526* (2021.01)

(56) References Cited

U.S. PATENT DOCUMENTS

| | | | | |
|---|---|---|---|---|
| 2013/0034751 | A1* | 2/2013 | Geng | H01M 50/502 |
| | | | | 429/7 |
| 2015/0086823 | A1* | 3/2015 | Liew | H01M 50/502 |
| | | | | 429/99 |
| 2015/0104689 | A1* | 4/2015 | Frias | H01M 50/502 |
| | | | | 439/862 |
| 2016/0014878 | A1* | 1/2016 | Kilhenny | H05K 1/0206 |
| | | | | 438/26 |
| 2018/0102519 | A1* | 4/2018 | Tschiggfrei | H01M 50/20 |
| 2019/0252744 | A1* | 8/2019 | Zimmermann | H01M 10/613 |
| 2020/0106076 | A1* | 4/2020 | Happ | H01M 50/502 |
| 2020/0220123 | A1* | 7/2020 | Ehrler | H01M 50/213 |

FOREIGN PATENT DOCUMENTS

| | | | |
|---|---|---|---|
| CN | 206 480 686 U | 9/2017 | |
| CN | 206480686 | * 9/2017 | ............. H01M 2/20 |
| DE | 515 051 C | 1/1931 | |
| DE | 10 2012 213 273 A1 | 2/2014 | |
| DE | 10 2016 120 835 A1 | 3/2018 | |
| DE | 10 2016 120 841 A1 | 3/2018 | |
| EP | 3 096 372 A1 | 11/2016 | |
| JP | 2014-022085 A | 2/2014 | |
| KR | 20-1999-0026639 U | 7/1999 | |
| KR | 10-2018-0021265 A | 3/2018 | |
| WO | WO 2017/207703 A1 | 12/2017 | |
| WO | WO 2018/003291 A1 | 1/2018 | |
| WO | WO 2018/055256 A1 | 3/2018 | |

OTHER PUBLICATIONS

Machine English translation of JP 2014-022085 to Heiji (Year: 2014).*

Machine English translation of KR 2018-0021265 to Kim (Year: 2018).*

* cited by examiner

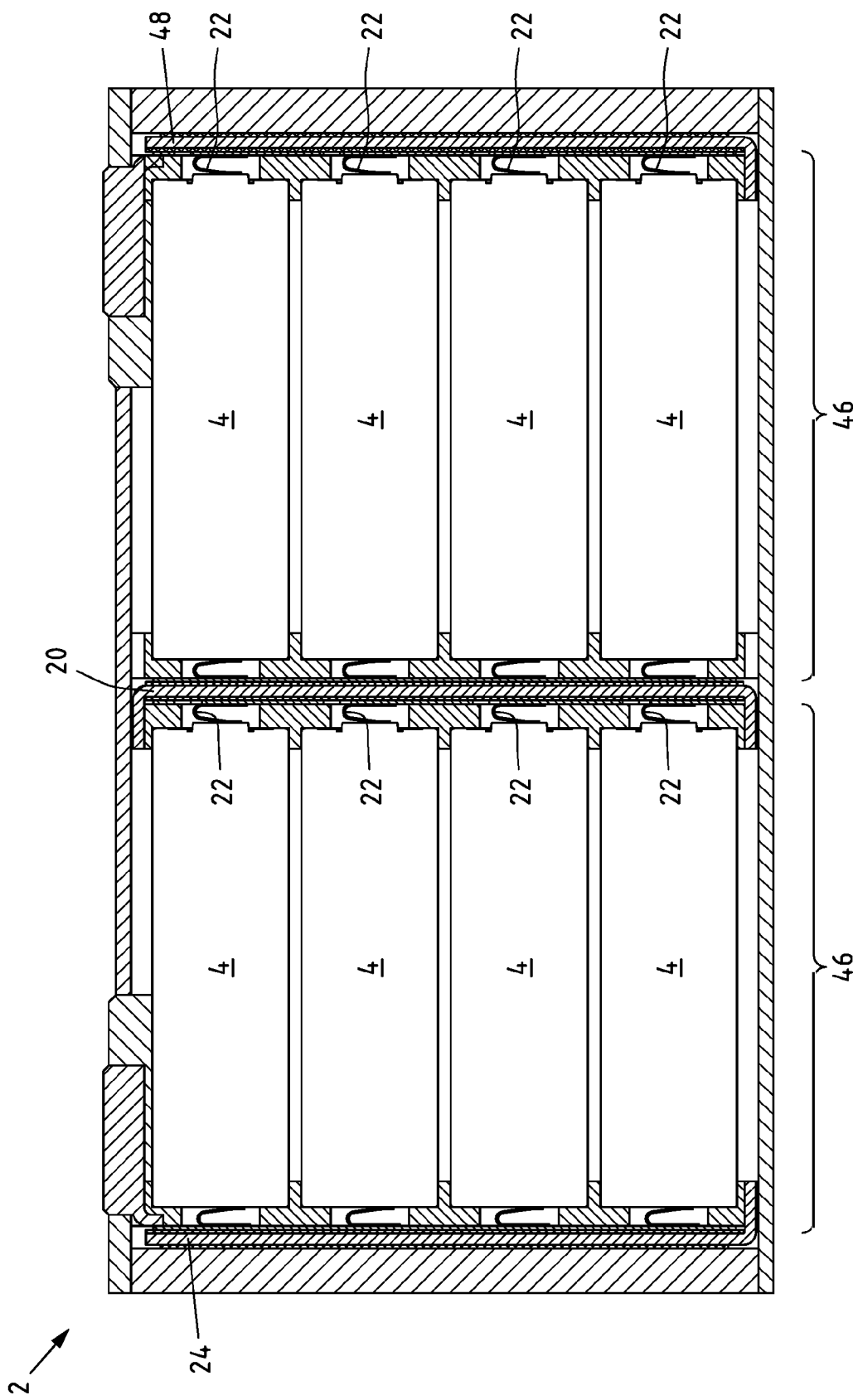

ARRANGEMENT FOR CELLS FOR STORING ELECTRICAL ENERGY HAVING A SPRING CONTACT ELEMENT

CROSS-REFERENCE TO RELATED PATENT APPLICATIONS

This patent application is a continuation of International Application No. PCT/EP2019/063457, filed on May 24, 2019, which claims the benefit of priority to European Patent Application No. 18174442.6, filed May 25, 2018, the entire teachings and disclosures of both applications are incorporated herein by reference thereto.

FIELD

The invention relates to an arrangement for cells for storing electrical energy, with at least two cells, wherein the at least two cells each have an axial direction, a circumferential region and two end faces, wherein the end faces are arranged opposite one another in the axial direction and at least one pole region is provided on one end face, with at least one connecting plate, wherein the at least two cells are arranged at the at least one connecting plate, wherein contact elements are provided between the at least one connecting plate and the pole regions of the at least two cells for an electrical contact. Furthermore, a method of manufacturing an arrangement and the use of a spring contact element are disclosed.

BACKGROUND

Cells for storing electrical energy are used in many areas of technology. Especially in the currently rapidly developing technologies of electromobility and the energy industry, high storage capacities for electrical energy and high electrical voltages are required. This is usually achieved by interconnecting individual primary and/or secondary cells in an arrangement for cells for storing electrical energy, e.g. as a battery pack.

In this context, the arrangement should ensure a reliable electrical contact and a reliable electrical connection between the cells. At the same time, a certain mechanical stability is required, for example against vibrations, shocks and impact loads, which occur, for example, during the operation of an electrically powered motor vehicle. A further requirement is sufficient thermal stability during operation of the arrangement, for example against heating up due to the introduction or extraction of high electrical currents.

In addition to pouch cells or so-called coffee bag cells and prismatic cells, whose geometry can be adapted to the arrangements, round cells are also interesting for cell arrangements. Round cells are available in large quantities with different dimensions and can be produced economically and cost-effectively. However, the integration and contacting of round cells in arrangements can be challenging due to the given, approximately cylindrical basic shape of the cells.

EP 3 096 372 A1 describes a battery storage module comprising a plurality of individual battery cells. On a side of a parallel plate facing away from the individual battery cells, one contact spring per each individual battery cell is arranged, the contact spring being connected to the parallel plate in a non-detachable and electrically conductive manner in each case.

Welding processes for contacting the cells can, however, make the production of the arrangement complex and put thermal stress on the contact elements and the cells. Therefore, further possibilities for contacting the cells in an arrangement have been considered in the state of the art.

DE 10 2012 213 273 A1, for example, discloses a device for contacting electrical energy storage cells, which are each connected at their poles to a printed circuit board via an electrically and thermally conductive contact element. For example, flat contact elements made of a pasty, hardening mass are introduced into the space between the energy storage cell and the printed circuit board.

In DE 10 2016 120 841 A1, a battery with a pressed cell arrangement is disclosed, wherein pressure plates at the battery start portion and battery end portion are connected to each other via tension elements, thereby pressing the battery cells against connecting plates. A further structure of an arrangement with connecting plates is described in DE 10 2016 120 835 A1.

However, it is problematic when pressing the cells by means of pressing them between plates that, especially in arrangements with several cells adjacent in axial direction, a mechanical overload of the pole regions of individual cells has been detected. In this case, the pole region of individual cells, for example a cover arranged on the positive pole, was deformed by the pressing via the tension elements, which could lead to a failure of the cell. Such a mechanical overload of the pole regions occurred sporadically and only on some cells, such that the process reliability in the production of the corresponding arrangements is worthy of improvement.

BRIEF SUMMARY

In view of this state of the art, the present invention is based on the task of providing an arrangement for cells for storing electrical energy which enables simple and reliable contacting of cells and in particular mitigates the disadvantages resulting from the state of the art. For the solution of the task, a method for manufacturing an arrangement, and the use of a spring contact element are also provided.

This task is solved, according to a first teaching of the invention relating to an above-mentioned arrangement, in that at least one of the contact elements, which is in contact with a cell, is designed as a spring contact element which, in a deformed state, provides a spring force for bearing against the respective pole region of the at least two cells to form the electrical contact between the at least one connecting plate and pole region.

Within the scope of the invention, it was recognized that in arrangements with at least one connecting plate which is in contact with the cells for example by pressing, an overload of individual cells is at least partially caused by a dimensional deviation of these individual cells. Cells manufactured on a large industrial scale can show significant length deviations or tolerances, for example in the axial direction. If, for example, cells being adjacent perpendicular to the axial direction are provided, these adjacent cells have approximately the same installation space available between the connecting plates in the axial direction. In the case of cells which have a greater length in the axial direction due to dimensional deviations, a high pressure on the pole regions of these longer cells occurs therefore in the state of the art, which can lead to mechanical overload. In this case, the high pressure weighs on the pole regions, which are usually adjacent to the electrode areas inside the cell and are therefore sensitive to mechanical stress.

Owing to the at least one of the contact elements per cell being designed as a spring contact element, it is achieved that when contacting a cell, the respective spring contact element can deform resiliently in the axial direction in accordance with the longitudinal expansion of the cell. At the same time, the spring contact element in a deformed state provides a spring force to bear against the associated pole region of the cell to establish the electrical contact between the connecting plate and the pole region, whereby an inseparable connection of the spring contact element and the pole region, for example a soldered or welded connection, can be omitted. The cells can thus be provided detachably in the arrangement.

In particular, the spring force is dimensioned in such a way that, on the one hand, a reliable bearing and thus a reliable electrical contact between the connecting plate and the pole region is achieved, which is essentially maintained even under mechanical loads such as shocks, vibrations and impact loads. Here, the mechanical loads can be predetermined by the intended use of the arrangement. On the other hand, the spring force can be limited to a maximum force which is indicative of a mechanical overload of the pole region of the cell.

In this context, bearing via spring force is understood to mean that the spring contact element is brought from a relaxed state into a spring-loaded state by the arrangement of the respective cell and the resulting position of the pole region, whereby the spring contact element is at least partially pressed against the pole region by the spring force. Here, a bearing is understood in particular as a detachable bearing resulting from the spring force. The electrical contact is preferably effectuated by a force-locking, whereby in particular there is no substance-bonded or form-fitted contacting. In this context, a force-locking is understood to mean in particular that the contact is (only) made by pressing against the pole region due to the spring force. However, the cell does not necessarily have to be fixed perpendicularly to the axial direction by the force-locking with the spring contact element.

The contact elements and/or the spring contact element are especially designed to ensure heat transfer between the cells and the connecting plate.

In a preferred embodiment, both pole regions of each cell can be in electrical contact with at least one spring contact element, whereby at least two spring contact elements are provided for each cell, accordingly. In this way, the cells are contacted on both sides (e.g. on both end faces) by the spring force of a spring contact element and the tolerance of the arrangement to dimensional deviations is further increased.

In an alternative embodiment, only one spring contact element is provided for each cell, which, for example, provides the electrical contact to one of the pole regions, for example for the positive or negative pole. The respective other pole region can, for example, be in direct contact to another connecting plate by a bearing. Likewise, the contact of the respective other pole region to a further connecting plate can be effectuated via a rigidly (i.e. without significant spring properties) formed contact element which is arranged between the further connecting plate and the other pole region.

The spring contact elements have resilient properties. It is possible that the spring contact elements show a linear-elastic behaviour or a non-linear-elastic behaviour. A linear-elastic behavior is understood in particular to mean that the spring contact elements exhibit, at least for a range of deformation, a linear-elastic behavior, whereby a spring constant can be assigned to the spring contact elements. Here, the range with a linear-elastic behaviour is in particular the range in which the spring contact elements are deformed in the arrangement, taking into account the dimensional deviations of the cells. A non-linear-elastic behavior can be given, for example, in that the spring force increases more than proportionately with the deflection (progressive spring behavior), or increases less than proportionately (degressive spring behavior). A progressive spring behavior can improve the electrical contact. A degressive spring behavior can be advantageous for avoiding overload of the pole regions.

The at least two cells are preferably designed as round cells or approximately cylindrical cells, with the axial direction corresponding to the axis of the cylinder and the circumferential region corresponding to the lateral surface. However, other types of cells are conceivable, in particular prismatic cells or cells with a round cross-section which deviates from a circular shape, for example with an elliptical cross-section. Preferably, hard-case cells are intended, in particular cells with a housing, sheathing or encapsulation of the electrodes or electrolyte inside the cell.

The cells used may have a predetermined dimensional deviation. For example, a nominal length is specified for the cells, whereby the deviation from the nominal length can be at least ±0.1%, in particular at least ±0.3%. For example, a nominal length of 65.0 mm is specified (e.g. for an "18650" cell with a nominal diameter of 18.0 mm) and the deviation or tolerance is ±0.2 mm (±0.31%) or +0.2 mm and −0.25 mm (+0.31% and −0.38%). Also conceivable are cells with a nominal diameter of 21.0 mm and nominal length of 70.0 mm ("21700" cell) with corresponding deviations of at least ±0.1%, in particular at least ±0.3%.

The pole regions are each assigned to an electrical pole of the cell and are provided for the electrical contacting of the pole. At least one of the pole regions extends over at least one section of the end face, in particular over a section in the middle of the end face. It is also conceivable that two pole regions are provided on one end face, which are contacted individually or both via spring contact elements.

The at least one connecting plate is configured for electrical connection of the cells with each other. Here, the connecting plate can effectuate a serial connection of cells, a parallel connection of cells or a combination thereof (mixed circuit), whereby the capacitance and voltage of the arrangement can be determined. The connecting plate is plate-shaped and in particular flat, i.e. the connecting plate has in particular a large length and width in comparison to a thickness, whereby the surface formed by length and width is approximately flat.

Connecting plates, which provide electrical contact to cells on both sides, can have at least one through hole. This is used to make contact between cells being adjacent in the axial direction. A simple design of a through hole is given by a metallic sleeve which passes through the connecting plate and, for example, electrically conductively connects electrically conductive layers on both sides of the connecting plate. In a preferred embodiment, at least one through hole is formed by a galvanic coating of at least one passage through the connecting plate. For example, the connecting plate is drilled through and the drilled hole is coated with a resin layer. The resin layer is used, for example, to electrically isolate a metal core from the through hole. The resin layer can optionally be drilled through again for dimensional accuracy. A conductive layer is (e.g. galvanically) applied on the resin layer, which allows the contacting of cells on both sides of the connecting plate.

In a simple embodiment, the connecting plate is designed as a simple plate made of a conductive material, e.g. a copper, aluminium or stainless steel plate or a plate made of an alloy thereof, which is provided with an electrically insulating layer in particular on one or both outer sides. In this case, the simple plate of a conductive material carries a current to and from the pole regions of the cells when the arrangement is used. If an insulating layer is provided on the outside of the connecting plate, the insulating layer may be interrupted at the position of the contact elements to allow electrical contact between the contact element and the plate of conductive material. A metal composite material can also be used as a conductive material plate, for example an aluminium or stainless steel core, which is cladded on one or both sides with a copper layer.

The connecting plate is especially configured to effectuate heat transfer between the cells. In this way, temperature differences between the individual cells can be balanced out so that the individual cells can be operated at temperatures as similar as possible. The connecting plate may also be configured to effectuate heat transfer from the cells to the outside, for example with at least one heat dissipation element, whereby the heat is dissipated for example to a housing and/or at least one cooling element. It is also conceivable that the cells are tempered and, for example, preheated via the connecting plate.

In a preferred embodiment, the connecting plate is designed as a laminated composite material, comprising at least one metal core and at least one conductive layer. On one or both sides of the metal core, an insulating layer or dielectric is arranged, on which in turn an electrically conductive layer is arranged. The connecting plate can be designed as an IMS (insulated metal core) plate. Preferably, the metal core does not carry any current when using the arrangement and is intended, for example, for effective heat transport. The metal core is based, for example, on aluminium, copper and/or stainless steel. Alternatively, other suitable materials can be used as core layers or substrate, such as ceramics, polymer-based materials or composite materials such as FR4 and FR5. The connecting plates can also be implemented as high-current printed circuit boards, for example based on FR4 and/or FR5 materials. The connecting plates can be implemented as thick copper printed circuit boards. Especially for mixed circuits, the connecting plates can also have structured conductor tracks. For example, laminated composite materials can be provided which have a structuring for selective contacting, for example based on the "Iceberg" technology or with wires laid and fixed on the plate ("wire laid") as well as inlay boards or power combi boards.

Also possible are combined printed circuit boards, whereby in particular at least two printed circuit boards with different dimensions (for example with different layer thicknesses of a conductive layer) are combined with one another in a connecting plate. For example, combi-board printed circuit boards are formed preferably without connecting elements such as plug connectors between the at least two printed circuit boards.

An electrically insulating layer is provided on the electrically conductive layer and/or the outside of the connecting plate, in particular on one or both sides. The connecting plate can be designed for contacting cells on one side of the connecting plate (e.g. four-layered, in particular in the sequence: metal core—insulating layer (dielectric)—conductive layer—insulating layer) or for contacting cells on both sides of the connecting plate (e.g. seven-layered, in particular in the sequence: insulating layer—conductive layer—insulating layer—metal core—insulating layer—conductive layer—insulating layer).

Further electronic components may be arranged on the connecting plates, which are in electrical contact in particular with the connecting plates or with electrically conductive layers or conductor tracks of the connecting plates.

For example, sensors such as temperature sensors are provided as electronic components, which can serve to monitor the operation of the arrangement when the cells are discharged or charged, for example to detect possible overheating of the arrangement or individual cells.

In this context, temperature sensors based on temperature-dependent resistance changes such as negative temperature coefficient (NTC) and/or positive temperature coefficient (PTC) thermistors are possible, e.g. PTC thermistors based on platinum (e.g. Pt100, Pt1000; also Pt50, Pt200, Pt500), based on nickel (e.g. Ni100, Ni1000) or on silicon (e.g. KTY). Thermocouples (e.g. types K, J, N, E, T, R, S and/or B) or temperature sensors with integrated signal converter can also be used. Temperature sensors based on a temperature dependency of a resonant frequency are also possible, e.g. oscillating quartz temperature sensors.

As additional electronic components, electrical fuse elements may be provided on and/or in the connecting plate. The fuse elements can serve to protect individual components of the arrangement, for example individual cells, against an overcurrent. For example, at least one conductor track fuse is provided in an electrically conductive layer of the connecting plate. A conductor track fuse can be provided, for example, as a cross-sectional tapering of a conductor track, whereby the cross-section can be selected according to the provided permissible current. In particular, a conductor track fuse is provided for each cell or each contact element, whereby, for example, an insulating area of the connecting plate is provided around the contact element, which is interrupted only by one or more tapered conductor tracks. Accordingly, the conductive layer of a connecting plate can also be used as a fuse element, which increases economic efficiency.

Similarly, at least one common fuse element may be provided for several or all cells of the arrangement, for example in relation with connection elements. For example, several common fuse elements with different response times are provided (e.g. primary, secondary and tertiary fuse element).

Fuse elements can be arranged on the connecting plate, e.g. in the form of contacted fuses such as bond wire fuses. Resettable fuse elements may also be provided, for example based on PTC thermistors using a temperature effect (for example, ceramic-based and/or polymer-based) or resettable electronic fuses (for example, semiconductor-based such as at least one MOSFET).

All electronic components, plug connectors and/or screw connectors connected to the connecting plate can be connected and contacted to the connecting plate by various methods, such as through hole technology (THT) and/or surface mounted technology (SMT). Also advantageous are connections using press-in technology, which allows economical connection of the components to the connecting plates, especially for temperature sensors and balancer connections.

A monitoring device may be provided which determines and in particular evaluates the sensor data recorded by the sensors (e.g. temperature sensors and sensors for monitoring current and/or voltage). A monitoring device may be integrated in the arrangement (e.g. within the housing of the arrangement) or provided externally, the arrangement providing, for example, an interface to the monitoring device.

Connections and contactings between the components, a monitoring device and/or connecting plates can in principle be implemented in wire-to-wire, wire-to-board and/or board-to-board technology. For example, the monitoring device is designed as a circuit board arrangement which is connected to the connecting plate and/or sensors using one of the mentioned techniques.

Other possible designs of combined connecting plates are combinations of printed circuit boards with flexible elements and/or flexible connecting plate sections. Examples are rigid-flex printed circuit boards as well as flex printed circuit boards ("3D printed circuit board"). Such combined (partially) flexible connecting plates can have, on the one hand, rigid connecting plate sections which serve to contact the cells via the contact elements. On the other hand, connecting plate sections, for example for the arrangement of sensor elements, balancer connections and/or for draining/supplying the current of the cells via flexible sections, can be connected to the rigid connecting plate sections and arranged at an angle, such that a particularly compact design of the arrangement is obtained.

At least one temperature sensor can be arranged on the connecting plate. Preferably, at least one temperature sensor is also arranged on the circumferential region of at least one cell and, in particular, centrally in the axial direction in order to determine the temperature of the respective cell more accurately. The at least one temperature sensor arranged on the circumferential region can be connected to the connecting plate via connecting wires of appropriate length or, for example, via combined connecting plates such as combi-board printed circuit boards, rigid-flex printed circuit boards, flex printed circuit boards, which are arranged at an angle, for example. It is possible here, that a printed circuit board for positioning the temperature sensor is arranged at an angle to the connecting plate and is contacted, for example, via plug connectors (board-to-board).

Since the spring contact elements allow a particularly dimensionally accurate arrangement in relation to the position of the connecting plate(s) despite dimensional deviations of the individual cells, also components and in particular temperature sensors can be reliably positioned on the circumferential region of cells in this way.

The at least two cells are arranged at the at least one connecting plate, in particular with the axial direction of the cells (essentially) along a normal of the connecting plate. The end faces and pole regions of the cells thus face the connecting plates. If several connecting plates are provided, the connecting plates are aligned in particular (essentially) parallel to one another and the cells can be arranged between the connecting plates.

Contact elements are provided between the at least one connecting plate and the pole regions of the at least two cells for an electrical contact. In this case, the contact elements are arranged in particular on an electrically (and thermally) conductive layer of the connecting plate, e.g. on a simple plate made of a conductive material or a conductive layer of a laminated composite material, whereby the electrically (and thermally) conductive layer of the connecting plate comes into electrical contact with the pole region of the cell. If an insulating layer is arranged on the outside of the connecting plate, the insulating layer may be interrupted at the position of the contact elements to allow electrical contact between the contact element and the conductive layer.

As already explained above, the failure of individual cells is attributed to the high pressure on the pole regions, which may be adjacent to the sensitive electrode areas inside the cell, the pressure being caused by dimensional deviations in the state of the art. By using the spring contact elements, excessive pressure on the pole regions can be avoided, which is improved in particular by the fact that in an embodiment of the arrangement according to the first teaching, the pole regions are in contact with the respective connecting plate only via bearing against the contact elements. In this way, even if the connecting plates are subjected to external loading with forces, vibrations and mechanical stresses as well as impact loads, the pole region of the cells is relieved by a deflection of the spring contact elements. The resilient properties of the spring contact elements ensure electrical contact even if the connecting plates are pulled apart (e.g. a tensile load on the arrangement in axial direction).

In an embodiment of the arrangement according to the first teaching, the at least two cells are held in the axial direction by a holding force with the at least one connecting plate. Holding the cells by means of a holding force is particularly advantageous compared to an inseparable connection of the cells with the at least one connecting plate, since the risk of the cell being impaired by the connection is reduced.

In a next embodiment of the arrangement according to the first teaching, at least one retaining element is provided adjacent to the at least one connecting plate, wherein the at least one retaining element positions at least one of the at least two cells in the axial direction. In this case, the at least one retaining element can effectuate the mechanical fixing of the cell at least in the axial direction, whereby a mechanical overload of the pole regions caused by an excessive spring force of the spring contact element can be prevented. In particular, the at least one retaining element positions the cell in the axial direction by means of a form-fit.

If, according to a further embodiment of the arrangement, the at least one retaining element positions the cells in the axial direction via bearing against an edge region at the transition between the circumferential region and the respective end face, the forces occurring during positioning (in particular a form-fit) and acting on the cell are advantageously not or only to a small extent exerted on the more sensitive pole regions. Particularly in the case of round cells, bearing against the edge region ensures that the forces occurring during positioning act on the circumferential region or the housing of the cell and not on the pole regions. At the same time, the dimensional deviation for the longitudinal expansion of the edge regions (e.g. the cell housing) can be smaller than for the longitudinal expansion of the pole regions. In this case, a more precise positioning of the cell can be achieved by the bearing against the edge regions, whereby larger dimensional deviations of the pole region are compensated by the spring contact element.

In a further embodiment of the arrangement, a spring constant of the spring contact element is predetermined, which is at least dependent on: the height of the spring contact element in the relaxed state relative to the connecting plate and the height of the retaining element relative to the connecting plate. The height of the retaining element can serve as a limit for the position of the cell in axial direction. In particular, the difference between the height of the spring contact element in the relaxed state relative to the connecting plate and the height of the retaining element relative to the connecting plate can be used to determine a maximum deflection of the spring contact element. The spring constant can thus be determined in such a way that a maximum force, which is indicative of a mechanical overload of the pole region of the cell, is not exceeded.

The spring constant of the spring contact element can at least be predetermined depending on: a height difference of the pole region in axial direction relative to the edge region.

A height difference can be given for example by an elevated pole region (e.g. in the form of a pole cover) or an indentation of the pole region. If the edge region, but not the pole region, is bearing against the retaining element, this height difference can result in an additional deflection of the spring contact element. The height difference can also be used to take into account a dimensional deviation or variation in the height difference of the pole region in the axial direction relative to the edge region.

In a further embodiment of the arrangement, force-locking means are provided on the at least one retaining element, which hold at least one of the cells via a force-locking. Holding via a force-locking increases the stability of the arrangement.

In one embodiment, the force-locking means may comprise or consist of an elastic material. This can also be used to provide force relief for dimensional deviations of the edge region of the cells, e.g. to avoid overloading the cell housing. If a spring constant can be assigned to each of the spring contact element and the force-locking means, then the spring constant of the force-locking means is in particular larger (e.g. at least one order of magnitude larger) than the spring constant of the spring contact elements. The force-locking means can also have an adhesive effect, which increases the stability of the arrangement and also facilitates assembly, since the cells can be fixed to the force-locking means when the arrangement is produced. For example, a polymer-based adhesive tape, in particular a foam-core adhesive tape, such as acrylic (foam) adhesive tape and/or polyethylene (foam) adhesive tape, can be used as force-locking means. Corresponding adhesive tapes can also meet the requirements for use in the automotive sector.

In a next embodiment of the arrangement, at least two connecting plates and at least one pressure element are provided, wherein the pressure element holds the at least two connecting plates at a predetermined distance. The at least one pressure element can be arranged, for example, at the edge of the connecting plates and, for example, on the outside of the arrangement. Alternatively or additionally, at least one pressure element can also be provided inside the arrangement, for example a pressure element such as a threaded rod, which runs approximately parallel to the axial direction of the cells and is arranged between cells being adjacent perpendicular to the axial direction.

By holding the connecting plates at a predetermined distance, it is achieved that the cells with a predetermined longitudinal extension cause a defined deflection of the spring contact elements. In addition, the connecting plates and the cells arranged in between form a construction unit or a modular structure which can be easily extended by adding further units. This simplifies production, as such components can be prefabricated and combined according to the requirements of the respective arrangement (for example, the capacitance and/or voltage of the arrangement). The predetermined distance is, for example, predetermined depending on the nominal length of the cells in the axial direction, the height of the spring contact elements relative to the connecting plate and/or the height of the retaining elements relative to the connecting plate. In particular, the predetermined distance is selected in such a way that the spring contact element on the one hand ensures a reliable bearing against the pole region and on the other hand limits the spring force below a maximum force which is indicative of a mechanical overload of the pole region of the cell.

In a next embodiment of the arrangement, at least one balancer connection is provided. Using at least one balancer connection, cells can be brought approximately to the same voltage during charging and/or discharging. For example, a voltage equalization of cells from different, interconnected arrangements is effectuated. Voltage differences can be caused, for example, by the properties of individual cells, such as different capacitances, impedances or aging conditions.

Owing to the cells being contacted with the connecting plates via spring contact elements, in particular the at least two connecting plates are held at a fixed, predetermined distance by at least one pressure element, whereby the risk of the cells being impaired due to dimensional deviations is reduced. Due to the predetermined distance, the balancer connections can also be easily designed. Due to the high dimensional accuracy, balancer connections can be brought into contact with the connecting plates, for example as a printed circuit board with connectors (e.g. as board-to-board or wire-to-board connectors), which simplifies the production of the arrangement. Equally conceivable are balancer connections in the form of connecting wires or cables, e.g. with wire-to-wire or wire-to-board connections to the connecting board.

The at least one balancer connection can be assigned a fuse element. For example, in the event of a crash or impact loads, the balancer connection may come into unintentional contact with other elements of the arrangement (for example an electrically conductive layer with a different potential). This creates the risk of a short circuit, which can be prevented by the fuse elements. Possible designs of the fuse elements comprise a cross-sectional tapering of a conductor track on the connecting plate, fuses, bond wire fuses, PTC thermistors based on ceramics and/or polymers, and/or electronic fuses (e.g. based on semiconductors such as transistors).

In a next embodiment of the arrangement, several cells are provided which are arranged adjacent in the axial direction, wherein the cells arranged adjacent in the axial direction are each arranged between connecting plates held at a predetermined distance. In addition to the modular design, by specifying the spacing for each layer of cells in the axial direction, it is possible to achieve that dimensional deviations of the cells in the axial direction do not affect the next layer of cells in the axial direction.

In an alternative embodiment, the distance of external connecting plates can be defined in an arrangement. For this purpose, the design with spring contact elements is advantageous, since mechanical overload can be avoided even in the case of several cells with high dimensional deviation, which are arranged adjacent in the axial direction (i.e. in the same "column" of cells).

In an embodiment of the arrangement according to the first teaching, the cells are held in the axial direction by a holding force between the connecting plates, the holding force being selected depending on an overload force of the cells. A corresponding holding force can cause a high mechanical stability of the arrangement, but at the same time it is avoided via the contact by means of spring contact elements that too high pressure is applied to the pole regions of individual cells, which have a dimensional deviation in the axial direction. The overload force can, for example, be a specification for a maximum force which may weigh on the cell housing. Especially in combination with the use of the previously described retaining elements, the holding force can be selected depending on an overload force for the edge region of the cell or the cell housing. The holding force can thus also be set high for the tensioning without mechanically overloading the cells. In particular, the holding force can be set to a maximum of 50%, in particular a maximum of 75% of the overload force.

In a further embodiment of the arrangement according to the first teaching, at least one holding element is provided for holding the cells perpendicular to the axial direction. For example, the cells are held perpendicular to the axial direction by a form-fit. In this case, a plate with recesses in the shape of the cross-section of the cells can be provided, the dimensions of which correspond approximately (taking into account the dimensional deviation or tolerance) to the dimensions of the cross-section of the cell. For round cells, round drill holes can be provided in a plate as a holding element. In particular, the at least one holding element can be designed in one piece with the at least one retaining element of a connecting plate, for example as a plate with recesses for the form-fit reception of the cells.

In a further embodiment of the arrangement according to the first teaching, the contact elements or spring contact elements are preferably formed in one piece with a retaining element and/or a holding element, and are designed in particular as a contact element or spring contact element separate from the connecting plate. For example, a retaining element and/or a holding element made of plastic is produced by injection moulding and the metallic contact elements are integrated with the production. This facilitates assembly, since the one-piece contact elements and retaining/holding elements can be placed together on the connecting plate. Due to the one-piece design, the contact elements are easily positioned on the connecting plate, whereby further fixing of the contact elements on the connecting plate can be omitted.

In principle, the contact elements can also have non-metallic components, for example a partial plastic over-moulding. In a different embodiment of the arrangement, the spring contact elements are made of a metallic material and are in particular free of plastics.

The spring contact elements can be made of steel (especially spring steel such as stainless spring steel). Preferably, the spring contact elements are made of a copper-containing material, for example copper or a copper alloy, which provides improved thermal and electrical conductivity, especially compared to spring steel, while at the same time maintaining the advantageous spring properties. With regard to the properties, in particular spring contact elements made of copper-beryllium alloys have proven to be advantageous. In this case, copper-beryllium alloys can have in particular a Be content of at most 2% by weight. Copper-nickel-beryllium alloys and copper-cobalt-beryllium alloys are also possible. Alternatively, copper alloys without a significant beryllium content may also be used, e.g. copper-tin alloys (bronze), copper-zinc alloys (brass), copper-nickel-zinc alloys (nickel silver), copper-chromium-titanium-silicon alloys and/or copper-titanium alloys. Also conceivable are nickel and nickel alloys, for example nickel-beryllium alloys or other types of alloys such as iron-cobalt-nickel alloys.

In principle, the spring contact element can have a single contact area which is bearing against the respective pole to form the electrical contact. In a further embodiment of the arrangement according to the first teaching, the spring contact element has a plurality of contact areas, in particular two, four, six or eight contact areas, which can be bearing against the respective pole region to form the electrical contact. With several contact areas a reliable bearing by means of spring force can be achieved, even if there are dimensional deviations of the pole regions, for example if the pole regions of a cell are not exactly or not completely parallel to each other. With several contact areas, a reliable electrical contact via the spring force is enabled, since several contact fingers are formed by the contact areas, which can also compensate for irregularities of the pole regions. In addition, an improved thermal contact is also ensured. At the same time, a substance-bonded connection such as soldering or welding of the contact areas can be avoided.

Examples for a formation of the spring contact element are compression springs, especially flat springs, shaped springs, leaf springs, flat shaped springs, disc springs. Preferably, the spring contact element is designed as a bent stamped part, which can be manufactured in particular from a metal sheet. The spring contact element can thus be easily designed with a suitable contact area. Alternatively, the spring contact element can be designed as a cut component (by laser cut or water jet cut) or etched component. For example, the spring contact element is designed as a shaped spring. The spring contact element can also have a fixing area for fixing and contacting with the connecting plate as well as a spring area which is designed as a resilient joint between the fixing area and the contact area.

In one embodiment of the arrangement, at least one of the contact elements is formed with a contact coating. This further reduces the susceptibility to corrosion and reduces the impairment of the pole region of the cell and of the contact element by environmental influences, for example by electrochemical processes under corrosive conditions. For example, the material provided for the contact coating is a coating based on precious metal, in particular gold and/or silver. (Hard) gold is resistant to friction, which is particularly advantageous for a force-locking contact. Gold also has a high electrical conductivity, has excellent solderability and is ductile, so that gold coatings are suitable for spring contact elements. Contact coatings with tin or nickel are also possible.

The contact coating can also have a multi-layer structure such as a duplex coating, for example a nickel layer with a layer of precious metal arranged on top. Various layer combinations and thicknesses are conceivable. In one example, the contact element can be coated (especially galvanically) with a nickel layer with a layer thickness of 1 µm to 4 µm, in particular 2 µm to 3 µm. Nickel can act as a diffusion barrier. A precious metal layer, in particular a (hard-) gold layer, can be applied on the nickel layer, in particular galvanically, the layer thickness being, for example, 0.1 µm to 2.0 µm. If a layer thickness for the precious metal layer of greater than 0.1 µm, in particular greater than 0.6 µm or 0.7 µm is selected, the porosity of the precious metal layer can be reduced in order to improve the corrosion resistance. With layer thicknesses below 2.0 µm, especially below 1.5 µm, material can be saved at the same time. Layers of nickel, palladium and gold can also be arranged on top of each other. By using palladium, the layer thickness for the (hard-) gold layer can—be further reduced to save material, whereby contact is effectuated via the gold layer. Coatings based on zinc or consisting of zinc are also possible, especially if welding of the contact element is intended.

The above mentioned coatings can be combined with one or more passivation layers. A passivation layer can be electrically conductive and improve the abrasion behaviour of contacts. In addition, a passivation layer can be dirt-repellent and/or water-repellent and improve in particular the corrosion behaviour. In principle, a passivation layer can have compounds with functional groups which can form a chemically functional surface by bonding on the (metal) surface. An example of this is thiols, especially for gold and silver surfaces. For the contact element, an overall coating or also a selective coating can be provided, whereby, for example, parts of the contact element are uncoated or have different coatings.

In one embodiment of the arrangement, at least one of the contact elements is formed with a contact coating whose standard potential in the electrochemical voltage series differs less than 1 V from the standard potential of the material of the pole region. This also further reduces the susceptibility to corrosion and reduces the impairment of the cell by environmental influences.

In one embodiment, the arrangement may have at least one connection element which serves to contact the entire arrangement for charging and/or discharging. For example, a power connection element is arranged on at least one connecting plate, which is connected to the connecting plate in particular by SMT, THT and/or press-in technology.

The at least one connection element can, for example, provide a connection for a connection means such as a connection cable, at least one conductor rail, in particular at least one laminated conductor rail, at least one conductor band, in particular at least one laminated conductor band, expansion band, braided band, flat fabric band, metal cable (e.g. copper cable), which can be designed with or without insulation. The connection is made e.g. via a plug connection, screw connection, substance-bonded connection or clamp connection.

For connection purposes, for example, an (outer) connecting plate, which has a conductive layer on both sides, is provided at at least one end region of the arrangement. The conductive layer facing the cells is in contact with the respective cells via contact elements. The conductive layer facing away from the cells is connected to the conductive layer facing the cells, e.g. via at least one through hole. The conductive layer facing away from the cells can have a contacting to a connection element.

In one embodiment, several connection elements are provided. A current distribution as homogeneous as possible can be achieved via a plurality of connection elements, so that the contact elements of individual cells, for example, have a distance to connection elements as equal as possible. Several connection elements can be provided, for example, on a previously described (outer) connecting plate at one end region of the arrangement and can be connected to the connecting plate in particular by SMT, THT and/or press-in technology.

A flat contact can be achieved also via an (outer) connecting plate even without connection elements, e.g. by a conductor rail bearing with one surface against the conductive (outer) layer of the connecting plate. For this purpose, for example, a substance-bonded connection can be provided.

According to a second teaching, in order to solve the above-mentioned task, a method of manufacturing an arrangement is specified, in which at least two cells are arranged on at least one connecting plate, wherein the at least two cells each have an axial direction, a circumferential region and two end faces, wherein the end faces are arranged opposite one another in the axial direction and at least one pole region is provided on one end face, in which an electrical contact is effected via contact elements between the at least one connecting plate and the pole regions of the at least two cells, and in which at least one spring contact element is used as a contact element, which is brought into a deformed state such that a spring force is provided for bearing against the respective pole region of the at least two cells to form the electrical contact between the at least one connecting plate and pole region. The method is intended in particular for producing an arrangement according to the first teaching.

According to a third teaching, in order to solve the above-mentioned task, the use of a spring contact element in an arrangement is specified, with at least two cells, wherein the at least two cells each have an axial direction, a circumferential region and two end faces, wherein the end faces are arranged opposite one another in the axial direction and at least one pole region is provided on one end face, with at least one connecting plate, wherein the at least two cells are arranged on the at least one connecting plate, wherein contact elements are provided between the at least one connecting plate and the pole regions of the at least two cells for an electrical contact.

The spring contact element or the arrangement according to the first teaching is preferably used in electromobility, for example in electrically powered vehicles, and in the energy industry. Also conceivable is the use in mobile charging stations or (mobile) energy supply facilities.

The exemplary embodiments of the present invention described above in this description shall also be understood as disclosed in all combinations with each other. In particular, exemplary embodiments in relation to the different teachings shall be understood as disclosed. In particular, by the disclosure of means and/or elements of the arrangement also the corresponding process step for its manufacture and use shall be disclosed.

BRIEF DESCRIPTION OF THE DRAWING

Further features and advantages of the invention are shown in the following detailed description of some exemplary embodiments of the present invention, in particular in connection with the drawing. The drawing shows in FIG. 1 is a schematic view of an embodiment of an arrangement 2 according to the first teaching, FIG. 3 is a schematic view of a further embodiment of an arrangement 2 according to the first teaching.

DETAILED DESCRIPTION

Figure 1:
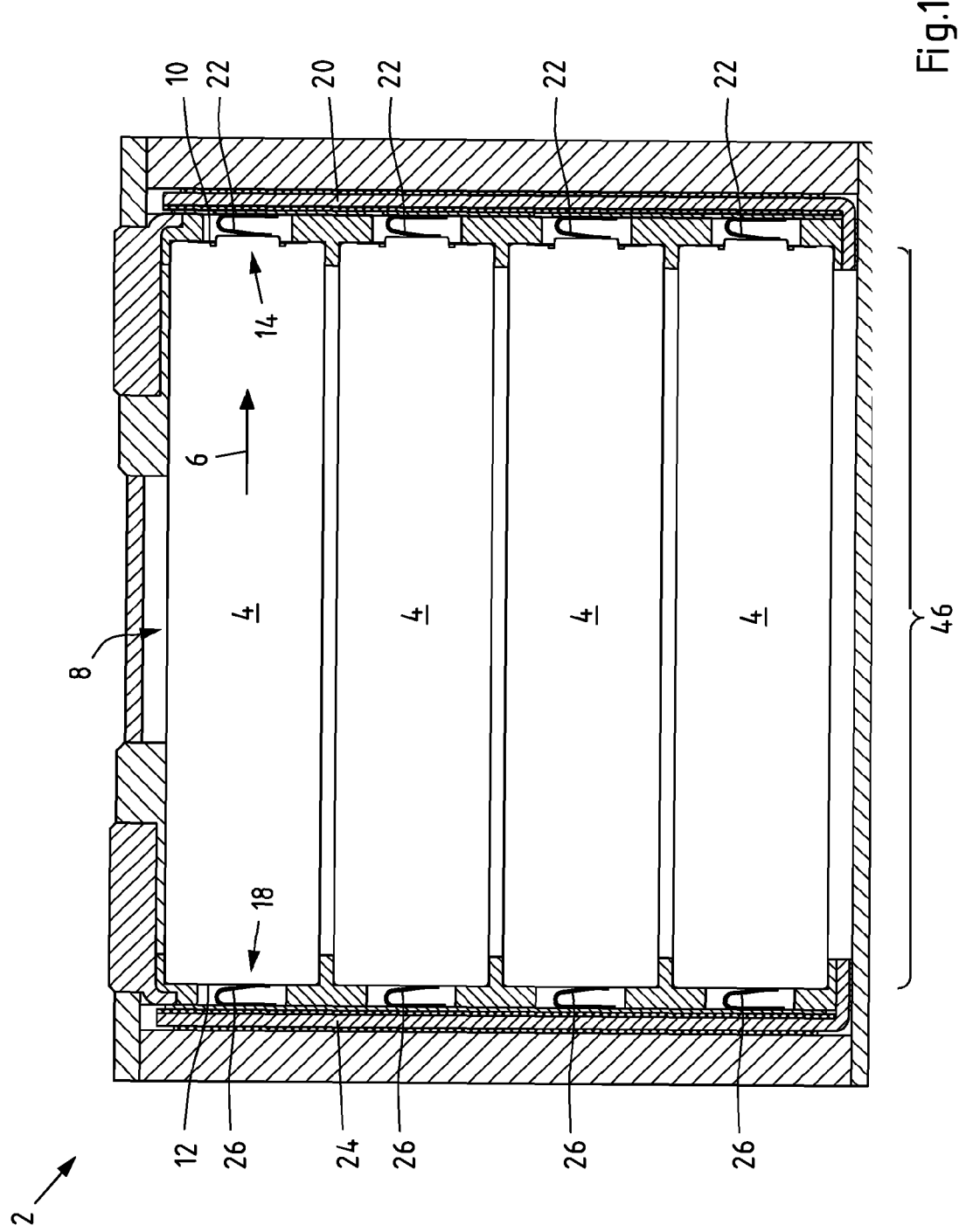

FIG. 1 shows a schematic view of an embodiment of an arrangement 2 according to the first teaching. The arrangement 2 is designed for cells 4 for storing electrical energy. At least two cells 4 are provided, which are formed as round cells of type 18650. The at least two cells 4 have an axial direction 6, which essentially corresponds to the cylindrical axis of the round cell. The cells 4 have a circumferential region 8, which essentially corresponds to the cylindrical shell of the round cell. Furthermore, the cells 4 each have two end faces 10, 12, which are arranged opposite one another in axial direction 6. A pole region 14 is provided on the end face 10, which is to be assigned to the positive pole of the respective cell 4. A pole region 18 is provided on the opposite end face 12, which is to be assigned to the negative pole of the respective cell 4.

A connecting plate 20 is provided, wherein the cells 4 are arranged at the connecting plate 20. Furthermore, between the connecting plate 20 and the respective pole region 14 of the cells 4, contact elements 22 are provided for an electrical contact, the contact elements 22 contacting the positive pole via the pole region 14 with an electrically conductive layer of the connecting plate 20.

FIG. 1 shows an example with a further connecting plate 24, wherein contact elements 26 between the connecting plate 24 and the pole region 18 of the cells 4, which is assigned to the negative pole, are provided for an electrical contact. The contact elements 26 are also shown in FIG. 1 as spring contact elements. Alternatively however, the contact elements 26 can also be designed as rigid contact elements (i.e. without significant resilient properties). In a further alternative, no contact elements 26 are provided on the further connecting plate 24 and the pole region 18 of cell 4 is in direct contact with the further connecting plate 24.

Figure 2A:
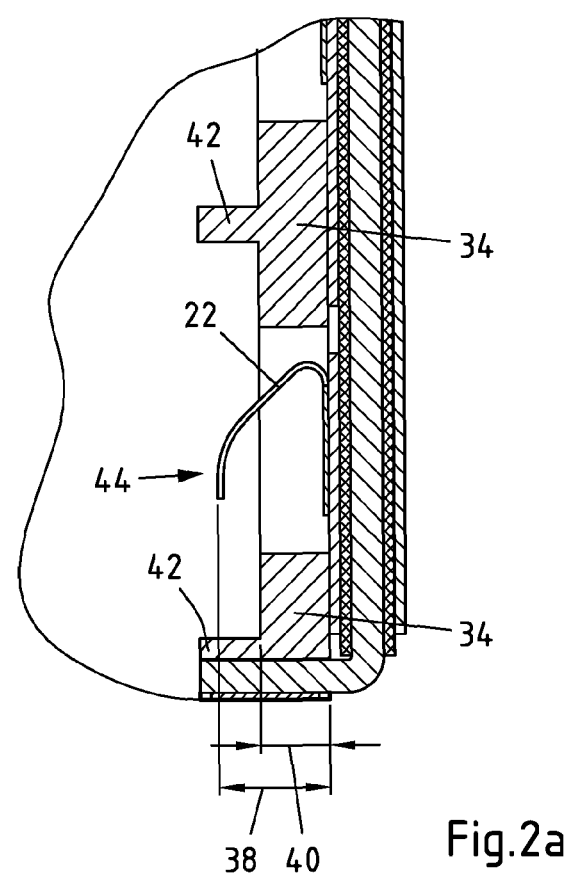
FIGS. 2a-c depict detailed views of the embodiment of the arrangement 2 from FIG. 1.
Figure 2B:
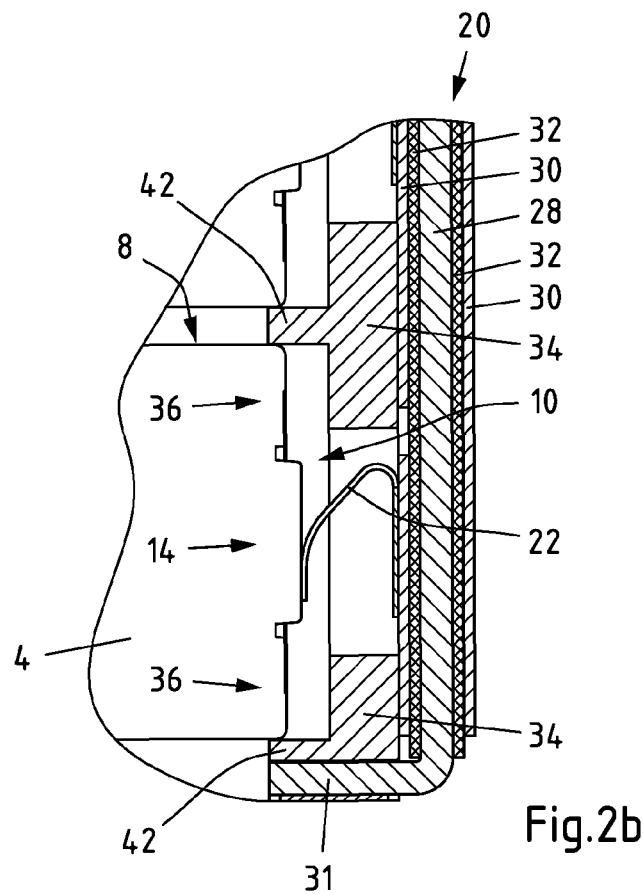
Figure 2C:
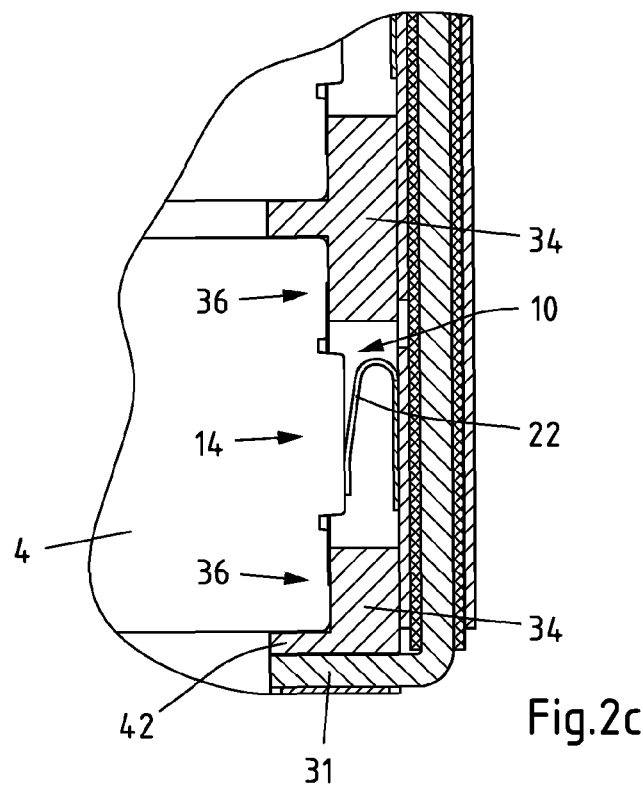

The contact elements 22 are designed as spring contact elements, which is further shown in the detailed views of the embodiment of the arrangement 2 in FIGS. 2a-c. In FIG. 2a an arrangement without inserted cells is shown. FIGS. 2b and 2c show the arrangement with inserted cells 4, whereby two different situations are shown.

By positioning the cells 4, the contact elements 22 are brought from a relaxed state (cf. FIG. 2a) into a deformed state (cf. FIGS. 2b and 2c), whereby the contact elements 22 provide a spring force for bearing against the respective pole region 14 of the cells 4 to form the electrical contact between the connecting plate 20 and pole region 14.

The design as a spring contact element ensures that the contact element 22 can deform resiliently when contacting the respective cell 4, even in case of different longitudinal expansions of the cell 4 in axial direction 6. The spring force or the spring constant is dimensioned in such a way that, on the one hand, a reliable bearing and thus a reliable electrical contact between connecting plate 20 and pole region 14 is achieved, which is essentially maintained even under mechanical loads such as shocks and vibrations. On the other hand, the spring force is limited to a maximum force which is indicative of a mechanical overload of the pole region 14 of the cell.

In one embodiment, FIG. 2b and FIG. 2c show two different situations resulting from different longitudinal expansions of the cell 4. In FIG. 2b for example, the cell 4 has a small longitudinal expansion according to a dimensional deviation or tolerance, whereby the spring constant of the contact element 22 is selected in such a way that the spring force ensures a reliable bearing at the pole region 14. In FIG. 2c, for example, the cell 4 has a large longitudinal expansion according to a dimensional deviation or tolerance, which is compensated by a (further) deflection of the contact element 22, whereby the spring force does not exceed a maximum force which is indicative of a mechanical overload of the pole region 14 of cell 4.

The electrical contact is effectuated via the spring contact element as a force-locking, whereby there is no substance-bonded or form-fitted contact. Soldering, gluing or welding of the contact elements 22 to the pole region 14 can be omitted.

The connecting plate 20 is designed as a laminated composite material comprising a metal core 28 and conductive layers 30 on both sides. The connecting plate 20 is configured to provide heat transfer between the cells 4, so that possible temperature differences between the cells 4 can be compensated. The contact elements 22 can effectuate heat transfer from the cells 4 to the connecting plates 20. The connecting plate 20 also has a heat dissipation element 31 which can dissipate heat absorbed and transported by the metal core 28 to the outside, e.g. via contact with a housing of the arrangement 2 and/or at least one cooling element. The electrically conductive layer 30 is separated from the metal core 28 by an insulating layer 32. When using the arrangement 2, the metal core 28 does not carry any current. Instead, an electrical contact between one of the electrically conductive layers 30 and the pole region 14 is established via the contact elements 22. The design with conductive layers 30 on both sides allows, for example, to establish contact also to other cells on the other side of the connecting plate 20 (not shown). At least one through hole is provided for the connecting plate 20, wherein at least one drill hole through the connecting plate 20 is provided with a resin layer and a galvanically applied conductive layer. The conductive layer brings the conductive layers 30 on both sides into contact with each other, so that axially adjacent cells 4 are connected in series. The connecting plate 20 can also have an outer insulating layer on one or both sides, which is interrupted at the contact elements 22 (not shown).

Retaining elements 34 are provided adjacent to the connecting plate 20, wherein the retaining elements 34 position the cells 4 in the axial direction. The retaining elements 34 can establish a form-fit with the cells 4 for positioning, as shown in particular in FIG. 2c. In this case, the retaining elements 34 position the cells 4 in the axial direction. For this purpose, the retaining elements 34 are in contact with the cells 4 at an edge region 36 of the cells 4 at the transition between the circumferential region 8 and the end face 10. This prevents mechanical overload of the pole regions 14 caused by excessive spring force of the spring contact element. The forces acting on the cell 4 during positioning are advantageously exerted on the edge region 36 and thus on the more stable housing of the cell 4. Moreover in this case, the dimensional deviation for the longitudinal expansion of the edge regions 36 can be smaller than for the longitudinal expansion of the pole regions 14, so that a more precise positioning is achieved.

The spring constant of the spring contact element is predetermined at least depending on a difference between the height 38 of the spring contact element in the relaxed state relative to the connecting plate 20 and the height 40 of the retaining element 34 relative to the connecting plate 20 (cf. FIG. 2a). The difference also determines the maximum spring deflection of the contact element 22 and thus the maximum spring force that can weigh on the pole region 14 (cf. FIG. 2c, whereby the edge region 36 is bearing against the retaining element 34 and thus the cell 4 cannot be moved any further towards the connecting plate 20). The spring constant is determined in such a way that an overload of the pole region 14 is prevented, even if a form-fitted connection of cell 4 with the retaining elements 34 is established. The spring constant of the spring contact element can be further predetermined depending on a height difference of the pole region 14 in the axial direction relative to the edge region 36, for example if, as shown in FIGS. 2b-c, the pole region 14 is elevated via a pole cover.

The retaining elements 34 are also provided with force-locking means in the form of adhesive tape (not shown), which can hold the cells 4 by means of a force-locking.

The retaining elements 34 are additionally designed with holding elements 42, in particular in one piece, whereby the holding elements 42 are provided for holding the cells perpendicular to the axial direction 6.

The contact element 22, designed as a spring contact element, is a stamped part made of copper beryllium. As further illustrated in FIG. 2a, the contact element 22 is designed as a leaf spring with a contact area 44, which can be brought into bearing against the pole region 14 to establish the electrical contact. The contact element 22 is optionally designed with a contact coating which comprises an galvanically applied nickel layer with a layer thickness of 1 μm to 4 μm, in particular 2 μm to 3 μm, and a gold layer with a layer thickness of 0.1 μm to 2.0 μm, in particular 0.6 μm to 1.5 μm. Alternatively or cumulatively, the contact coating can be adapted to the material of the pole region 14 by the standard potential of the contact coating deviating less than 1 V from the standard potential of the material of the pole region 14 in the electrochemical voltage series.

In the embodiment of FIG. 1, also a pressure element is provided at the two connecting plates 20, 24, the pressure element holding the two connecting plates 20, 24 at a predetermined distance. The distance can be selected depending on the dimensions of the cells 4, the spring constants of the contact element 22 and the retaining elements 34. By determining the distance between the connecting plates 20, 24, a construction unit 46 is formed for the cells 4 which are arranged adjacent one another perpendicular to the axial direction 6 (i.e. a "layer" of cells 4 in axial direction 6). Within the construction unit 46, possible dimensional deviations of the cells 4 in the longitudinal direction are compensated by the spring contact elements described above. In addition, a predefined length dimension is maintained for the construction 46, which simplifies the arrangement of further elements in the arrangement 2. For example, a temperature sensor (not shown) can be arranged centrally on the circumferential region 8 of a cell 4. Balancer connections (not shown) can also be provided, which are formed, for example, by printed circuit boards between the connecting plates 20, 24.

FIG. 3 shows a schematic view of a further embodiment of an arrangement 2 according to the first teaching, with several cells 4 arranged adjacent in axial direction 6 being additionally provided. The cells 4 arranged adjacent in axial direction 6 are each arranged between connecting plates 20, 24, 48 held at the predetermined distance. Correspondingly, several construction units 46 are formed next to one another in axial direction 6, whereby the construction units 46 are each comparable with the structure shown in FIG. 1. For clarification, not all reference signs from FIG. 1 are shown in FIG. 3.

Each of the construction units 46 comprises a compensation of possible dimensional deviations of the cells 4 in axial direction by the contact elements 22, 26, which are designed as spring contact elements. It is thus achieved that dimensional deviations of individual cells 4 do not continue to the adjacent construction units 46. The design of the units 46 also simplifies production, since arrangements can be designed modularly and formed by combinations of construction units 46.

FIGS. 1 - 3 show that both pole regions 14, 18 of cells 4 are contacted by spring contact elements (contact elements 22, 26). Alternatively, each cell 4 can also be contacted at one pole region 14, 18 with only one contact element 22 designed as a spring contact element. For example, the respective other pole region 14, 18 is then contacted by a rigid contact element or is bearing directly against the connecting plate.

Figure 4:
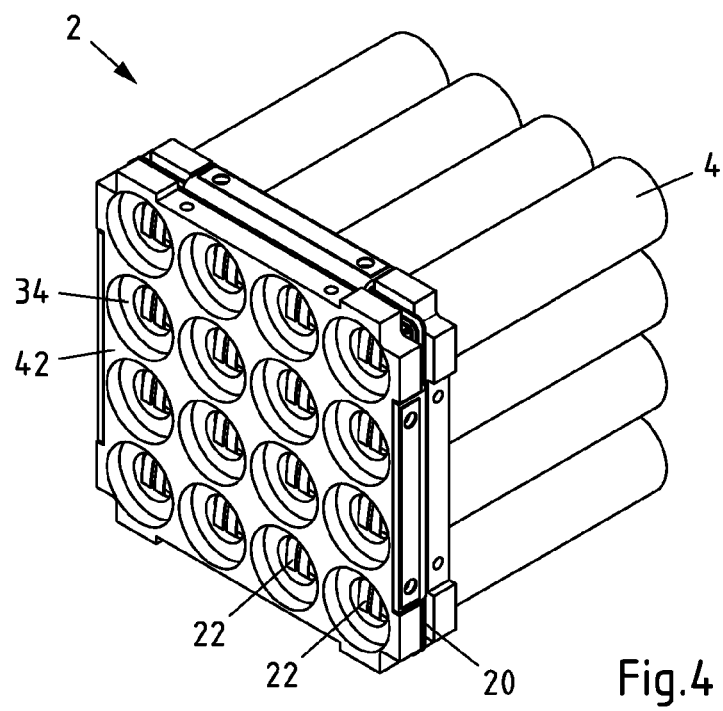
FIG. 4 is a schematic view of a further embodiment of an arrangement 2 according to the first teaching in a perspective view.

FIG. 4 shows a schematic view of a further embodiment of an arrangement 2 according to the first teaching in a perspective view. Here it can be seen that the particularly one-piece design of the retaining elements 34 with the holding elements 42 forms a plate with recesses for the end face 10 of the cells 4 and passages for the contact elements 22.

Furthermore, the contact elements 22 designed as spring contact elements are designed as a bent stamped part made of a metal sheet with two contact areas.

Figure 5:
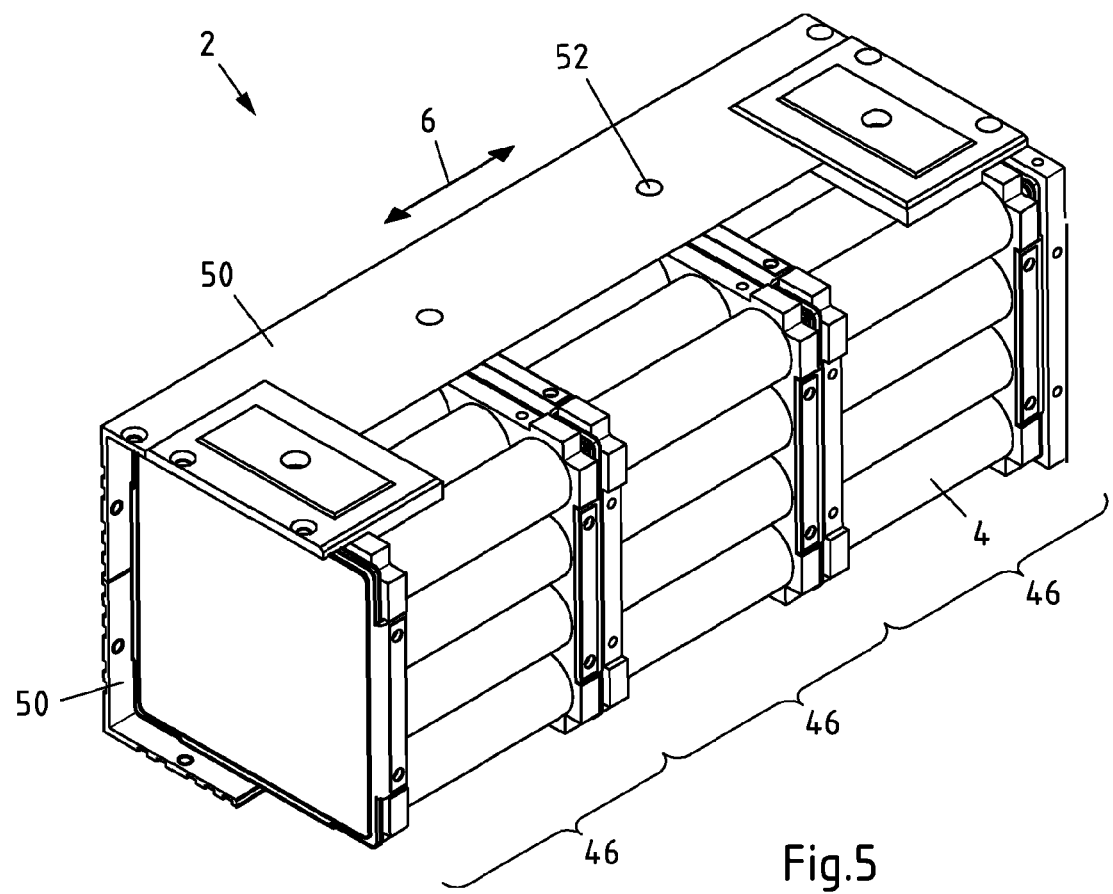
FIG. 5 is a schematic view of a further embodiment of an arrangement 2 according to the first teaching in a perspective view.

FIG. 5 shows a schematic view of a further embodiment of an arrangement 2 according to the first teaching in a perspective view. Here, several cells 4 adjacent in axial direction 6 are provided, forming three construction units 46, each of which is kept at a predetermined distance.

Pressure elements 50 are provided, which are connected to connecting plates via connecting means 52. The pressure elements 50 can optionally also form part of a housing for the arrangement 2. The pressure elements 50 can also be designed to improve heat transfer from the connecting plates to the outside. The pressure elements 50 can keep the respective connecting plates at a predetermined distance, in particular by a holding force of not more than 50% of the overload force of the cell housing. The predetermined distance is predetermined depending on the nominal length of the cells 4 in the axial direction 6 and the height 40 of the retaining elements 34 relative to the connecting plate 20, taking into account the spring constants of the contact element 22. The predetermined distance is selected in such a way that the spring contact element on the one hand ensures a reliable bearing against the pole region 14, and on the other hand limits the spring force below a maximum force that is indicative of a mechanical overload of the pole region 14 of cell 4.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An arrangement for cells for storing electrical energy, comprising:
    at least two cells,
        wherein the at least two cells each have an axial direction, a circumferential region and two end faces,
        wherein the end faces are arranged opposite one another in the axial direction and at least one pole region is provided on one end face, and
    at least one connecting plate,
    wherein the at least two cells are arranged at the at least one connecting plate,
    wherein contact elements are provided between the at least one connecting plate and the pole regions of the at least two cells for an electrical contact,
    wherein at least one of the contact elements, which is in contact with a cell, is designed as a spring contact element which, in a deformed state, provides a spring force for bearing against the respective pole region of the at least two cells to form the electrical contact between the at least one connecting plate and pole region,
    wherein at least one retaining element is provided adjacent to the at least one connecting plate, wherein the at least one retaining element positions at least one of the at least two cells in the axial direction by means of a form fit,
    wherein a spring constant of the spring contact element is predetermined, which is at least dependent on:
    the height of the spring contact element in the relaxed state relative to the connecting plate, and
    the height of the retaining element relative to the connecting plate, such that a maximum force on a pole region of the cell, which is indicative of a mechanical overload of the pole region of the cell, is not exceeded;
    wherein force-locking means are provided on the at least one retaining element, which hold at least one of the cells via a force-locking; and
    wherein the force-locking means comprise an elastic material.

* * * * *